UNITED STATES PATENT OFFICE.

JOSEPH SCHNEIBLE, OF CHICAGO, ILLINOIS.

ART OF CONSERVING FRESH VEGETABLES.

1,242,728.  Specification of Letters Patent.  Patented Oct. 9, 1917.

No Drawing. Continuation of application Serial No. 180,858, filed July 16, 1917. This application filed August 8, 1917. Serial No. 185,195.

*To all whom it may concern:*

Be it known that I, JOSEPH SCHNEIBLE, a citizen of the United States, residing at Chicago, in the county of Cook and State of Illinois, have invented a new and useful Improvement in the Art of Conserving Fresh Vegetables, of which the following is a specification.

My invention relates to a treatment of green or fresh vegetables whereby they can be kept in cold storage or dried without impairing their natural flavor, palatability and appearance, and further that their digestibility, wholesomeness and nutritiveness will not be materially lessened.

Fresh vegetables, such as spinach, beans, peas, kale, asparagus, and the like, contain organic salts, particularly those of iron and potassium, and also albuminoids and certain organic acids. When these vegetables are kept in cold storage or are subjected to air, as in the ordinary drying methods, they deteriorate to an extent tending to destroy or impair their appearance, palatability, taste, and food properties and consequently also, their market value. I attribute this deterioration to a chemical action of the acids on the salts and albuminoids.

I prevent such impairment by neutralizing, more or less completely, the organic acid contained in the fresh vegetable by the action of a suitable alkali or alkali compound, such as sodium bicarbonate or calcium hydrate.

I have discovered that green vegetables treated in this manner may be placed in cold storage, either for transportation or keeping purposes, for considerable lengths of time without their undergoing chemical change or impairment as is the case where it is attempted to keep such green vegetables in cold storage without being treated in accordance with my invention.

Furthermore, I have discovered that when fresh vegetables have been treated in accordance with my invention they may be dried in any ordinary manner without injuriously affecting the albumins contained in such vegetables and also that such vegetables will not become hard and flinty as is the case where they are dried without first being subjected to my treatment.

In carrying out my invention, the fresh vegetable to be treated, which may, if necessary, be first freed of undesirable parts and cleaned, as by washing, and, if desired, otherwise prepared, as by slicing, is subjected by immersion to the action of a dilute solution of sodium bicarbonate. The strength of the solution may be determined by the acidity and physical condition of the vegetable and also by the temperature of the bath, but should, generally speaking, be maintained from 0.1 to 0.5 per cent. I prefer to keep the temperature of the solution at about 65 degrees C., but in no case should the bath be heated to a temperature where the cellular structure of the vegetable is caused to give up any of its contained juices. This temperature is sufficient to cause the alkali to rapidly penetrate the surface film of the vegetable and react quickly on the organic acids; and it is sufficiently high to pasteurize the vegetable and accomplish the necessary acid-neutralization in a comparatively short time, say, about 1 to 5 minutes.

A fresh vegetable after being thus treated is removed from the alkali solution and drained, when it is ready to be placed in cold storage for later use, or dried in any desired manner.

I claim:—

1. The process of treating fresh or green vegetables which consists in immersing them in an alkali solution maintained at a temperature which will pasteurize said vegetables without causing their cellular structures to give up the juices contained therein.

2. The process of treating fresh or green vegetables which consists in immersing them in a solution of sodium bicarbonate maintained at a temperature which will pasteurize said vegetables without causing their cellular structure to give up the juices contained therein.

3. The process of treating fresh or green vegetables which consists in immersing them in an alkali solution maintained at a temperature of about 65° C. whereby said vegetables will be pasteurized without causing their cellular structures to give up the juices contained therein.

4. The process of treating fresh or green vegetables which consists in immersing them in an alkali solution of less than one per cent. strength maintained at a temperature which will pasteurize said vegetables without causing their cellular structures to give up the juices contained therein.

5. The process of treating fresh or green vegetables which consists in immersing them in a sodium bicarbonate solution of less than one per cent. strength maintained at a temperature of approximately 65° C., whereby said vegetables will be pasteurized without causing their cellular structures to give up the juices contained therein.

JOSEPH SCHNEIBLE.

Witnesses:
F. L. BROWNE,
FRANCIS M. PHELPS.